March 17, 1959    C. RATHÉ    2,877,666
CONTINUOUSLY VARIABLE GEAR DRIVES OR TRANSMISSIONS
Filed Aug. 20, 1957    2 Sheets-Sheet 1

INVENTOR:
CHARLES RATHÉ
BY: Leon M. Strauss
AGT

March 17, 1959  C. RATHÉ  2,877,666
CONTINUOUSLY VARIABLE GEAR DRIVES OR TRANSMISSIONS
Filed Aug. 20, 1957  2 Sheets-Sheet 2

INVENTOR:
CHARLES RATHÉ
BY: Leon M. Straus
AGT.

United States Patent Office 2,877,666
Patented Mar. 17, 1959

2,877,666
CONTINUOUSLY VARIABLE GEAR DRIVES OR TRANSMISSIONS

Charles Rathé, Ennetbaden, Switzerland
Application August 20, 1957, Serial No. 679,254
Claims priority, application Switzerland April 17, 1957
9 Claims. (Cl. 74—681)

The present invention relates to infinitely variable gear drives or transmissions.

It has heretofore been proposed to construct a transmission in which a stepless or continuous change of the speed of rotation is possible due to the fact that to one gear segment there is imparted by means of an adjustable crank mechanism an oscillatory motion of variable amplitude, this motion being transmitted in one direction only to an output or driven shaft through the intermediary of a gear provided with a free-running clutch.

In order to impart to the output shaft a certain uniformity of operation, i. e., to maintain the shaft continuously in positive force transmitting connection with the drive mechanism, a plurality of transmission or gearing units may be connected together so as to act one after the other and in timed sequence on the common output shaft. Despite this it is, however, not possible with such a transmission to attain a motion of the output shaft which is uniform over the entire rotation of the shaft. Apart from this, oscillating masses, such as the oscillating gear segments, for example, are usually undesirable.

In a different type of transmission which is operated via a stepless V-belt drive, the cone pulleys are provided with radial ribs between which are formed radial depressions. The actual transmission element consists of a link chain which connects the two pairs of cone pulleys with one another, each chain link containing a number of radially and transversely displaceable lamellae which, as the chain is wound over the cone pulleys, come into meshing or gripping engagement with the aforesaid ribs or depressions.

It has furthermore been proposed to make the diameter of one of two wheels disposed in rolling contact with one another variable, each of a plurality of segments of these wheels being provided with a number of teeth and being displaceable on a conical shaft or roller, while the other of the aforesaid two wheels is to be provided with a crown of movable lamellae which adapt themselves to the teeth or gaps between the teeth of the first wheel as the latter rolls over the second wheel.

The two last described types of transmissions are subject to the common disadvantage that not only are the lamellae, as a result of the changing meshing action at their front edges, subjected to a great deal of wear and tear which also adversely affects the ribs or teeth coming into engagement with these lamellae, but that furthermore the continuous crowding or displacement of the lamellae also entails a considerable loss in power.

In practice it has been found that such transmissions, by virtue of their constructions, are not suited for work requiring less than about 2 H. P. Where more than about 25 H. P. is required, they are also not suitable or advantageous because under such conditions the surface pressures on the transmission parts become too great.

The permissible speeds which can be attained are, therefore, small, on the one hand because the many lamellae slide back and forth on one another and generate a great deal of frictional heat, and on the other hand because between the lamellae and the teeth of the wheel which they entrain there occurs at times an edge to edge contact the force of which, to avoid damage to the transmission, must not be permitted to become too great. Further, these transmissions are very noisy. Where minimum dimensions and weight are factors of importance, such a transmission is also usually not practical.

The present invention, consequently, contemplates the provision of a continuously or infinitely variable gear drive or transmission with which the above described disadvantages and drawbacks can be avoided.

The gear transmission which, according to the present invention, is provided with at least one pair of gears rolling on one another and arranged to admit an adjustment of the spacing between their axes, and in which the diameter of one gear of the pair of gears is variable in dependence on the change of axis spacing, is characterized by the fact that the variable diameter gear is provided with a crown of tooth elements movably connected with one another so that all of the tooth elements act together or jointly at least at their lateral edges with at least a single guide spiral of constant pitch.

The aforesaid transmission is further characterized by the fact that at least one of the tooth elements is in rotary connection with a catch member fixed to and rotatable with a shaft constituting the axis of the said variable diameter gear, and by the fact that, for varying the diameter of this gear, adjusting means are provided which effect a rotation of the guide spiral relative to the aforesaid shaft and in conjunction therewith a tangential and radial relative motion of the crown of tooth elements.

This transmission thus combines the advantages of a stepped gear drive with those of a continuously or infinitely variable friction drive without entailing the disadvantages inherent in both of these types of drives.

These and other objects of the present invention will become more clear from the following detailed description when taken in conjunction with the accompanying drawings, in which.

Figure 1:
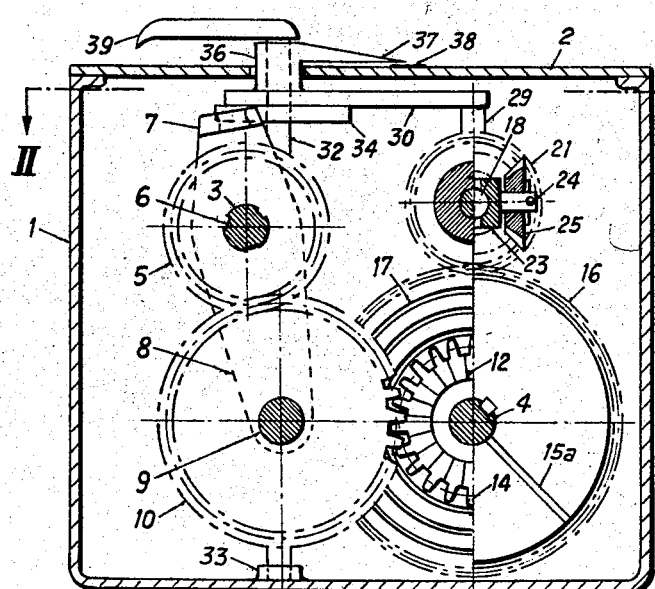
Fig. 1 is a sectional view of the transmission, the view being taken along the line I—I in Fig. 2.
Figure 2:
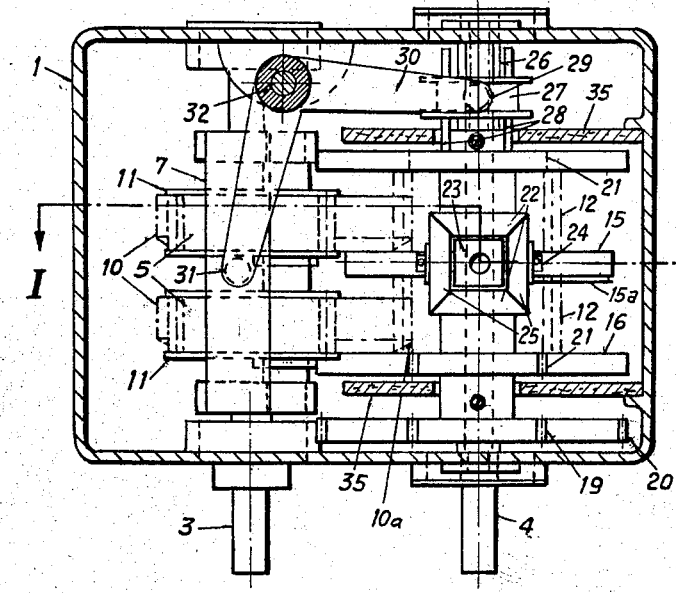
Fig. 2 is a sectional view taken along the line II—II in Fig. 1.

Referring now more particularly to Figs. 1 and 2, it will be seen that the transmission according to the present invention comprises a housing 1 closed by a cover or lid 2. Two parallel shafts 3 and 4 journalled in the walls of the housing 1 extend through the latter, one end of each shaft protruding out of the housing. The shaft 3 carries two gears 5 having the same number of teeth and individually displaceably guided by helical grooves 6, and also a U-shaped rocker 7 which is rotatable on the shaft 3. The rocker 7 has a pair of arms 8 between which extends an auxiliary shaft 9 disposed parallel to the shafts 3 and 4, the shaft 9 carrying two rotatable and axially displaceable auxiliary gears 10 meshing with the gears 5. The axial position of the auxiliary gears 10 is determined by the position of the gears 5 by virtue of the fact that the latter are each provided with two flanges 11 between which the gears 10 are located and by means of which they are guided.

Figure 3:
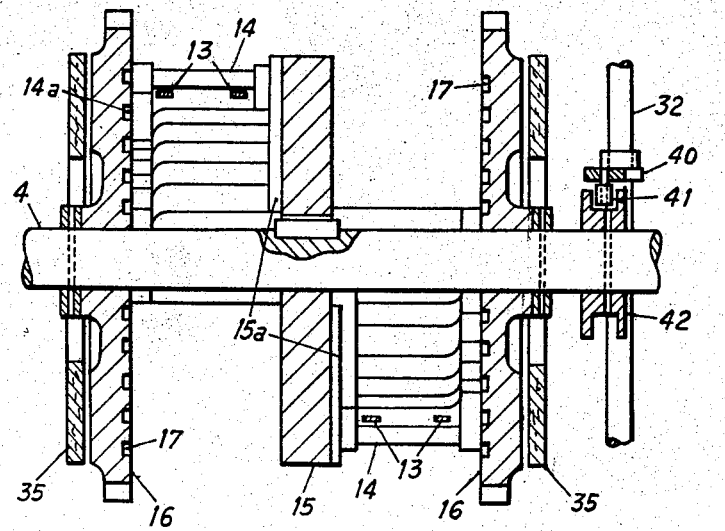
Fig. 3 is an axial sectional view, on an enlarged scale, of the variable diameter gears.

The shaft 4 carries two variable diameter gears, generally designated 12, which possess respective tooth crowns each consisting of a plurality of tooth elements 14 movably interconnected with one another by two flexible steel bands 13 extending beneath the bases of the teeth (see Fig. 3).

The gears 12 are furthermore associated with a common catch plate or driving disk 15 which is keyed to the shaft 4, and each gear 12 is also associated with a respective toothed adjusting disk or gear 16, hereinafter also designated by the term "spiral wheel," each of the spiral wheels 16 being provided on the side thereof facing the catch plate 15 with a spiral guide groove 17 of constant pitch, the two spiral grooves running counter to one another.

Each tooth crown is in engagement via at least one of its tooth elements 14 with a catch key or driving rib 15a, of which one is provided on each side of the catch plate 15 in such a manner that the two keys or ribs are offset 180° from one another. In lieu of keys, the catch plate 15 could also be provided with correspondingly positioned grooves.

All of the tooth elements of each of the two tooth crowns are slidably guided by the spiral groove 17 of the associated spiral wheel 16 through the intermediary of cams 14a. Upon rotation of either spiral wheel 16 relative to the associated tooth crown or the catch plate 15 in one or the other direction, the diameter or radius of the respective tooth crown is either increased or decreased.

As may be clearly seen from Fig. 3, the two tooth crowns are also offset 180° from one another, so that each crown when at its largest diameter forms a semicircle and when at its minimum diameter forms a closed circle.

The movements of the tooth crowns to their desired diametral states is controlled by a shaft 18 which is journalled in the housing 1 and extends parallel to the shafts 3 and 4. The shaft 18 is rotatably connected with the shaft 4 via gears 19 and 20. Two further gears 21 are freely rotatably arranged on the shaft 18 and mesh with the spiral wheels 16. The gears 21 are retained against axial displacement by suitable set collars or locking rings, and each gear 21 is integral with a respective bevel gear 22. Between the two bevel gears 22 is arranged a transverse hub 23 which is pinned to the shaft 18. The hub 23 is provided with pivots 24 on which are arranged freely rotatable bevel gears 25 meshing with the bevel gears 22. The bevel gears 22 and 25 together constitute a differential transmission which is driven by the shaft 4 and runs idly as long as no diameter regulation takes place.

The shaft 18 is provided at one end with a square thread 26, and a nut 27 is threaded onto this end of the shaft and guided by coupling or follower pins 28 fixed to the adjacent gear 21. The nut 27, which thus always rotates together with the gear 21, is provided with a peripheral groove into which extends a bolt 29 attached to one arm of a bell-crank lever 30. The other arm of the bell-crank lever, which is swingably mounted on a rod 32 in the housing 1, carries a further bolt 31 engaging the center piece of the rocker 7. The rod 32 defining the axis of rotation of the bell-crank lever 30 is rotatably journalled in a socket 33 and a bracket 34. Upon actuation of the differential for the purpose of diameter variation, the nut 27 moves along the threads 26 and thus effects via the bell-crank lever 30 and the rocker 7 a radial displacement of the shaft 9 and, consequently, a corresponding variation of the distance between the axes of the gears 12 and the auxiliary gears 10.

Positioned adjacent each spiral wheel 16 at a fixed location within the housing 1 is a brake plate 35 either made of or coated with a material having a high coefficient of friction. A diameter variation is effected by pressing either one of the spiral wheels 16 against the immediately adjacent brake plate 35 which frictionally engages and brakes the said wheel 16 and sets the differential in operation.

Depending on whether one or the other spiral wheel is pressed against its associated brake plate, there occurs correspondingly either an increase in diameter or a decrease in diameter. By way of example, the brake plates 35 have rigid bases and are fixed in the housing at three of their sides.

The bell-crank lever 30 is further provided with an upwardly extending hub 36 which carries a pointer 37 movable over a scale 38 on the lid 2 to enable the lever position and thus the prevailing transmission ratio to be indicated on the scale 38. Moreover, a handle or gripping member 39 is fixed to the rod 32 to permit changing of the transmission ratio. As may be seen from Fig. 3, a one-armed lever 40 is pinned to the lower end of the rod 32 and carries a roller 41 coacting with a displaceable sleeve 42 pinned to the shaft 4. This arrangement renders possible that by movement of the handle 39 the shaft 4 may be axially displaced in either direction together with the spiral wheels 16 so as to press one or the other of these against its brake plate 35. The change in the transmission ratio brought about in dependence on the duration of contact between either of the spiral wheels and its associated brake plate is, as mentioned above, indicated on the scale 38 by the pointer 37.

The extent of the range of variation of this transmission ratio is delimited by suitable abutments (not shown) which cooperate with the hub 36. In order to maintain in their mid-positions the aforesaid handle and the shaft 4, the lever 40 may be subjected to the forces of two oppositely acting springs (not shown).

Figure 4:
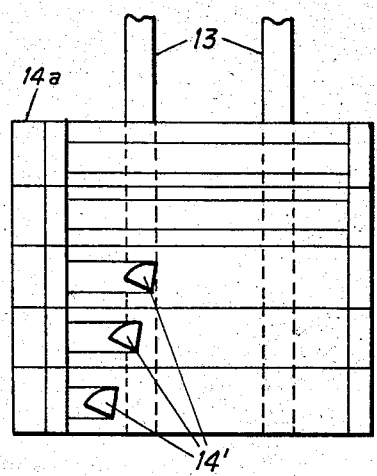
Fig. 4 is a plan view, on an enlarged scale, of an unwound crown of tooth elements.
Figure 5:
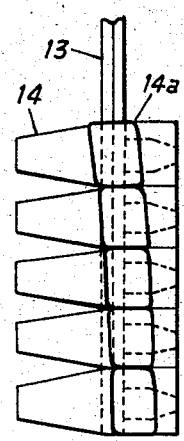
Fig. 5 is a side view of the tooth element crown shown in Fig. 4.

Referring now to Figs. 4 and 5, it will be seen that each tooth crown consists of individual adjacent and aligned tooth elements 14 which, in the described embodiment of the invention, are held together by two flexible multiple bands or straps 13. The first three tooth elements of each crown are constructed as running in teeth 14', so that the same tooth profile does not extend over the entire width. These teeth provide in tangential and radial direction a wedge-shaped path for the associated in-running auxiliary gear 10 which is provided, for the purpose of ready sliding movement along this path, with correspondingly shaped slanted portions or bevels 10a (see Fig. 2).

Such sliding of the auxiliary gear along the corresponding running-in teeth 14' occurs, however, only when, during a change in the transmission ratio, it happens that one tooth hits another instead of entering into a space between two adjacent opposite teeth, i. e., when there arises an error of graduation or positioning of the gear 12.

As will be easily understood, each auxiliary gear 10 moves axially as it slides over the running-in teeth 14', and the gears 5 thus move with the gears 10. The gears 5, however, also slide peripherally in the grooves 6 so that the axial movement brings about a tangential movement depending in magnitude on the pitch of the grooves 6. In this manner, the auxiliary gears 10 perforce find their proper engagement with the gears 12.

The positioning error which arises especially when, after a regulating operation, the partial circle diameter of the gears 12 does not correspond to an integral number of teeth, must, of course, be corrected as soon as it occurs. This is effected in the following manner.

An auxiliary gear 10 hits against one of the running-in teeth 14' and exerts an axial pressure, as a result of which the corresponding gear 12 together with the shaft 4 first move in the opposite direction. This initial axial movement brings one of the spiral wheels 16 into contact with the associated brake plate 35. This spiral wheel thus is braked and the positioning of the gear 12 corrected as along as an axial pressure and thus a positioning error are present. The two gears 5 are, of course, adjusted concurrently therewith via the differential transmission.

In order to initiate the regulating pressure, it is understood that a variety of constructions may be employed, such as a push button. It is further possible to interchange, i.e., to reverse the functions of, the driving and driven shafts 3 and 4 protruding from the housing and in the position shown by means of two gear pairs and clutches. In this manner the regulating range may be doubled, i. e., increased to 1:4 at a relatively small gear diameter. The second regulating range requires a re-regulation, both ways, however, being constructed as one way regulation with automatic reversal at the end of the first regulating range.

In lieu of displacing the shaft 4 relative to the fixed brake plates, the latter could, of course, be movable instead. The braking of the gears 16 can also take place in other ways. Depending on the pitch of the grooves in the shaft 3, the positioning error correction can be effected with greater or lesser speed relative to the gear rolling path. Moreover, in lieu of constructing the transmission of two gear groups, it is possible to unite even three or four gear groups into one transmission, whereby the attainable transmission ratio may be increased.

In order to avoid an axial displacement of the shaft 4 in its journals during adjustment of the transmission ratio, the elements situated on the shaft 4 could be mounted on a sleeve axially displaceable along the shaft but rotatable therewith.

It is further possible to link the tooth elements to one another by means of chain links rather than by flexible bands. A so constructed tooth crown can, for example, cooperate with a multi-path guide spiral.

Each tooth crown may cooperate with guide spirals on both sides instead of only on one, in which case there would have to be a guide spiral and a catch plate on each side.

In order to connect a plurality of tooth elements with the catch plates, the teeth may be partly provided with pins at their front edges which pins engage in a plurality of grooves which joint about an exactly radially extending groove and, relative to the latter, enclose a small angle between one another.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a continuously variable gear transmission, including at least one fixed-diameter gear and at least one variable-diameter gear rolling over one another, a pair of parallel shafts rotatably supporting said gears, respectively, and defining the axes of rotation for said gears, and adjusting means for effecting a relative lateral adjustment between said shafts to thereby vary the radial distance between said axes of rotation of said gears; the improvement comprising a crown of movably interconnected tooth elements positioned about one of said shafts and constituting said variable-diameter gear, plate means defining at least one spiral guide groove of constant pitch arranged laterally of and coaxially with said variable-diameter gear and slidably receiving at least one side edge of each of said tooth elements, a catch member fixed to said one shaft for rotation therewith, means providing a connection between at least one of said tooth elements and said catch member to enable joint rotation of the latter with said tooth elements, and means operatively interconnecting said adjusting means with said plate means for effecting rotation of the latter with said spiral guide groove relative to said one shaft to vary the diameter of said variable-diameter gear and to effect a tangential and radial movement of said crown of tooth elements while simultaneously effecting the variation of the radial distance between said axes of rotation of said fixed-diameter and variable-diameter gears.

2. In a gear transmission according to claim 1; at least an additional variable-diameter gear, identical with the first-named variable-diameter gear, carried by said one shaft on the side of said catch member remote from the first-named variable-diameter gear, additional plate means defining at least one spiral guide groove of constant pitch arranged laterally of and coaxially with said additional variable-diameter gear and slidably receiving at least one side edge of each of the tooth elements of said adidtional variable-diameter gear, means providing a connection between at least one of the last-named tooth elements and said catch member, at least an additional fixed-diameter gear carried by said shaft and rolling over said additional variable-diameter gear, a further shaft extending parallel to said pair of shafts, a rocker supported by said further shaft and carrying said other shaft with said fixed-diameter gears, and at least two additional fixed-diameter gears mounted on said further shaft and meshing, respectively, with said fixed-diameter gears on said other shaft.

3. In a gear transmission according to claim 2; said adjusting means comprising a regulating shaft extending parallel to the first-named three shafts and geared to said one shaft for rotating the latter, differential gearing carried by said regulating shaft, a first portion of said differential gearing being connected to said regulating shaft and two other portions of said differential gearing being rotatably connected, respectively, to said plate means, and means operatively connecting said regulating shaft and one of said other portions of said differential gearing to said rocker, whereby the latter is pivoted about the axis of said further shaft to displace said other shaft relative to said one shaft in response to a difference between the rotational speed of said regulating shaft and the rotational speed of said other portions of said differential gearing.

4. In a gear transmission according to claim 3; braking means for effecting said difference between said rotational speed of said regulating shaft and said rotational speed of said other differential gearing portions.

5. In a gear transmission according to claim 4; said braking means comprising a plurality of braking members each associated with a respective one of said plate means, and actuating means for bringing each of said plate means and its associated braking member into and out of cooperative relationship.

6. In a gear transmission according to claim 5; said plate means being arranged for axial displacement, said braking members being fixed in position, and said actuating means being operatively connected to said plate means, respectively, for reciprocally displacing the same axially into and out of engagement with said braking members.

7. A gear transmission according to claim 4; said means for connecting said regulating shaft and said other differential gearing portions to said rocker comprising a threaded extension on said regulating shaft, an adjusting nut screwed onto said threaded shaft extension and fixedly connected with said one of said other differential gearing portions for rotation therewith, and a bell-crank lever having two arms, one of said arms being coupled to said adjusting nut, and the other of said arms being coupled to said rocker.

8. A gear transmission according to claim 7; said bell-crank lever being provided with means for indicating the transmission ratio.

9. A gear transmission according to claim 2; said fixed-diameter gears on both said other shaft and said further shaft being carried by the same for joint axial displacement therealong, said further shaft being provided with a plurality of peripheral helical grooves, said fixed-diameter gears on said further shaft being provided with projections engaging and riding in said helical grooves, respectively, and said crowns of tooth elements of said variable-diameter gears being provided at least at one of their ends with a plurality of running-in teeth for engaging and effecting an axial displacement of said fixed-diameter gears on said other shaft, to thereby effect both axial and rotary displacements of said fixed-diameter gears on said further shaft, whenever an error in the positioning of the teeth of said variable-diameter gears arises.

No references cited.